United States Patent [19]

Schneider

[11] Patent Number: 4,764,314
[45] Date of Patent: Aug. 16, 1988

[54] DIFFUSER FOR AERATION BASIN

[76] Inventor: Norbert Schneider, Holbeinstrasse 13, D-5657 Haan, Fed. Rep. of Germany

[21] Appl. No.: 13,158

[22] Filed: Feb. 10, 1987

Related U.S. Application Data

[63] Continuation of Ser. No. 714,658, Mar. 21, 1985, abandoned.

[30] Foreign Application Priority Data

Mar. 21, 1984 [DE] Fed. Rep. of Germany ....... 3410267

[51] Int. Cl.$^4$ .............................................. B01F 3/04
[52] U.S. Cl. .................................... 261/62; 137/854; 210/221.2; 239/145; 261/122
[58] Field of Search ........................ 261/62, 122–124; 239/145; 210/221.2; 209/170; 137/533.17, 533.21, 854

[56] References Cited

U.S. PATENT DOCUMENTS

| | | | |
|---|---|---|---|
| 1,642,051 | 9/1927 | Wall | 261/122 |
| 2,718,275 | 9/1955 | Banks | 261/122 X |
| 3,396,950 | 8/1968 | Wood | 261/122 |
| 3,441,216 | 4/1969 | Good | 261/122 X |
| 3,977,606 | 8/1976 | Wyss | 261/122 X |
| 3,997,634 | 12/1976 | Downs | 261/122 |
| 4,007,240 | 2/1977 | Gosden | 261/122 |
| 4,046,845 | 9/1977 | Veeder | 261/122 |
| 4,243,616 | 1/1981 | Wyss | 261/122 |

FOREIGN PATENT DOCUMENTS 824376 11/1959 United Kingdom ............... 261/122

Primary Examiner—Richard L. Chiesa
Attorney, Agent, or Firm—Carl Rowold

[57] ABSTRACT

A diffuser for introducing gas in bubbles into liquid held in an aeration tank comprising a body member having a backing surface and passaging extending from a gas inlet to an outlet at the backing surface, and a flexible, gas permeable membrane covering the backing surface and secured at its periphery to the body member in sealing relationship thereto. The membrane is adapted to distend and move away from the backing surface upon delivery of gas under pressure to diffuser, with the gas flowing through the distended portion of the membrane and into the liquid in the form of relatively small gas bubbles, and adapted to collapse into engagement with the backing surface when gas under pressure is not delivered to the diffuser. A check valve comprising a movable valve member on the membrane and a valve seat on the backing surface enables flow of gas into the space between backing surface and the membrane, and blocks flow of liquid into the passaging in the body member.

6 Claims, 1 Drawing Sheet

DIFFUSER FOR AERATION BASIN

This application is a continuation of application Ser. No. 714,658, filed on Mar. 21, 1985, which is now abandoned.

BACKGROUND OF THE INVENTION

This invention relates to a diffuser for introducing gas in the form of bubbles into liquid held in an aeration basin, and more particular to so-called "disc" type diffusers having a bubble generating member of generally disc shape.

Diffusers for aeration basins holding a bio-degradeable liquid such as sewage are typically mounted at regularly spaced intervals on a grid of piping covering the bottom of the aeration basin. The piping delivers gas (usually air) under pressure to the diffusers, and each of the diffusers in turn generate relatively small bubbles in the liquid. Thus, air is delivered to the liquid in the basin in the form of small bubbles throughout the extent of the basin to enhance the transfer of oxygen to the liquid for faster oxidation treatment of the liquid.

Conventional "disc" type diffusers comprise a body member mounted on the piping and a disc of gas permeable ceramic material secured to the body member. The body member has a gas inlet at the bottom thereof adapted to receive air under pressure from the piping and a generally circular open top in flow communication with the gas inlet. The disc of ceramic material is fitted over the top of the body member in sealing relationship therewith. When air pressure is delivered to the diffuser, it flows into the inlet, up toward the top of the body member and out through the gas permeable ceramic disc into the sewage in the form of bubbles. Flow of liquid back down into the diffuser, when air under pressure is not being delivered, is blocked by the ceramic disc which is impermeable to the flow of liquid therethrough.

A problem with the conventional "disc" type diffuser is that over time suspended solids in the liquid being treated tend to deposit on the ceramic disc and block the gas passages or pores in the disc. This blockage tends to reduce the flow rate of air through the disc thereby reducing the amount of oxygen delivered to the liquid for treating the liquid. In the extreme, this blockage stops all flow of gas through the ceramic disc, thus rendering the diffuser incapable of performing its intended purpose. In addition, with the ceramic disc completely blocked, the air pressure may become so great as to cause the disc to be blown off the body member, thus also rendering the diffuser incapable of performing its intended purpose. In addition, the latter occurence allows liquid to enter the piping system, which may damage it.

SUMMARY OF THE INVENTION

Among the several objects of this invention may be noted the provision of a diffuser having a bubble generation membrane which remains free of deposits of solids in the liquid being treated which could block the pores in the membrane; the provision of such a membrane which has pores therein which open only when air under pressure is delivered to the diffuser and close when air under pressure is not delivered to the diffuser for keeping suspended solids from entering the pores; and the provision of such a diffuser which has a check valve associated therewith for positively blocking flow of liquid into the piping.

The diffuser means of this invention comprises a body member having a backing surface and passaging in the body member extending from a gas inlet adapted to receive gas under pressure from a source thereof to an outlet at the backing surface for delivery of the gas under pressure thereto. The diffuser further includes a flexible, gas permeable membrane covering the backing surface and secured generally along the periphery of the membrane to the body member in sealing relation, the membrane being adapted to distend and move away from the backing surface upon the delivery of gas under pressure to the diffuser, with the gas flowing through the distended portion of the membrane and into the liquid in the form of relatively small gas bubbles, and being adapted to collapse into engagement with the backing member when gas under pressure is not delivered to the diffuser. The diffuser also has check valve means comprising a movable valve member on the membrane and a valve seat on the body member at said outlet, the movable valve member being moved away from the valve seat along with the membrane when air under pressure is delivered to the diffuser to open the check valve for allowing the gas to enter the space between the member and the backing surface, and the movable valve member being moved into seating relationship with the valve seat to close the check valve when gas under pressure is no longer delivered, for blocking flow of liquid into the passaging in the diffuser.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
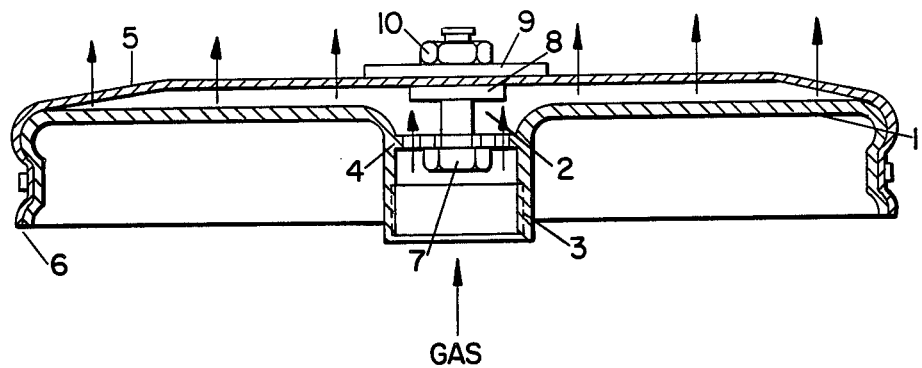
FIG. 1 is a vertical central section of a first embodiment of the diffuser means of this invention.

Referring to FIG. 1, there is shown a first embodiment of the diffuser of this invention comprising a body member having a generally planar, disc-shaped backing surface 1, and passaging 2 extending up from a lower gas inlet 3. The gas inlet 3 is adapted to receive a connection or fitting from piping for delivery of gas (such as air or oxygen) under pressure from a source thereof.

A membrane 5 of gas permeable, elastic material is stretched under light tension over the backing surface. The periphery of the membrane is secured to the rim of the body member in sealing relationship by hoop band 6. To ensure a tight fit of the membrane or the body member, the edges of the membrane may be provided with a thickened edge margin (not shown) engageable by the band.

The membrane material is an elastomeric material which does not react chemically with the liquid being treated and is resistant to the growth of micro organisms thereon. The membrane has been perforated with a large number of relatively small slots or pores. With the membrane in an untensioned or slightly tensioned condition these slots are closed and thus block flow of either gas or liquid therethrough. However, when the membrane is distended (highly tensioned) upon the delivery of gas under pressure to the diffuser, the slots open into large pores for relatively high flow rates of gas therethrough.

While the closure of the pores is generally effective to block flow of liquid back into the diffuser, when air under pressure is not delivered to the diffuser, check valve means is provided to positively block such flow of liquid. The movable member of the check valve comprises a disc 9 in axial alignment with but of larger diameter than the mouth of the inlet in the backing surface 1, which serves as the valve seat of the check valve. The disc 9 is secured to the membrane by means of a bolt 7 extending through the disc, and threaded ring 8 and nut 10.

As shown in FIG. 1, stop means generally at a central portion of the membrane holds this portion of the membrane generally adjacent the backing surface of the body member when air under pressure is delivered to the diffuser. The stop means includes interengageable means, such as the head of the bolt 7 and an abutment member 4 in the passaging 2 in the body member, enabling movement of the central portion of the membrane away from the backing surface within a predetermined range of distances.

Figure 2:
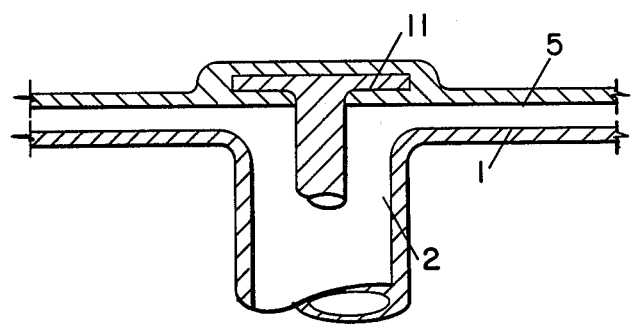
FIG. 2 is a vertical central section of a second embodiment of the diffuser means.

In the operation of the diffuser, when gas under pressure is delivered to the diffuser, the air causes the membrane to distend and move away from the backing surface to the extent allowed by the stop. As the membrane distends, the pores or slots open thereby allowing the air to flow into the liquid in the form of small bubbles emanating over the entire surface of the distended portion of the membrane. When air under pressure is no longer provided, the membrane collapses into engagement with the backing surface and the pores or slots close to block flow of liquid into the diffuser. The check valve thus provides positive blockage of liquid flow into the diffuser Referring to FIG. 2, there is generally shown a second embodiment of the diffuser which is similar to the first except the numerous elements forming the movable valve member of the check valve and stop means or the membrane have been replaced by a single member 11 having a head integrally formed in the membrane. As with the first embodiment, the portion of the membrane beneath the movable valve member is the element engageable with the valve seat.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Diffuser means for use in an aeration basin for introducing gas in the form of bubbles into liquid held in the basin, said diffuser means comprising:
    a body member having a backing surface and passaging in the body member extending from a gas inlet adapted to receive gas under pressure from a source thereof to an outlet at the backing surface for delivery of the gas under pressure thereto;
    a flexible, gas permeable membrane covering the backing surfce and secured generally along the periphery of the membrane to the body member in sealing relation, the membrane being adapted to distend and move away from the backing surface upon the delivery of gas under pressure to the diffuser, with the gas flowing through the distended portion of the membrane and into the liquid in the form of relatively small gas bubbles, and being adapted to collapse into engagement with the backing member when gas under pressure is not delivered to the diffuser;
    and check valve means comprising a movable valve member on and movable with the membrane and a valve seat on the body member at said outlet, the movable valve member being moved away from the valve seat along with the membrane when gas under pressure is delivered to the diffuser to open the check valve for allowing the gas to enter the space between the member and the backing surface, and the movable valve member being moved into sealing relationship with the valve seat to close the check valve when gas under pressure is no longer delivered, for blocking flow of liquid into the passaging in the diffuser means; and
    stop means comprising interengageable means on the body member and secured to the membrane generally at a central portion thereof for limiting movement of said central portion of the membrane away from the backing surface to a predetermined position spaced apart from yet being generally adjacent to the backing surface, whereby when gas under pressure is delivered to the diffuser means, the membrane distends and moves away from the backing surface but with the stop means holding the member spaced generally adjacent to the backing surface for flow of gas through the distended portion of the membrane.

2. The diffuser means set forth in claim 1 wherein the movable valve member is formed of fluid impermeable material and is carried on the membrane.

3. The diffuser set forth in claim 1 wherein the movable valve member is integrally formed in the membrane.

4. The diffuser set forth in claim 1 wherein the backing surface of the diffuser is generally planar and the member is secured to the diffuser around the periphery of the backing surface.

5. The diffuser set forth in claim 4 wherein the backing surface and the distended portion of the membrane are of generally disc shaped configuration.

6. The diffuser set forth in claim 1 wherein the membrane has a plurality of small pores formed therein which expand in size when the membrane is distended by the gas under pressure for flow of gas therethrough and which close when the membrane collapses against the backing surface for blocking flow of liquid therethrough.

* * * * *